July 28, 1959   H. T. MACHLANSKI   2,896,868
METHOD OF AND APPARATUS FOR WINDING COILS IN PLACE
Filed May 7, 1952
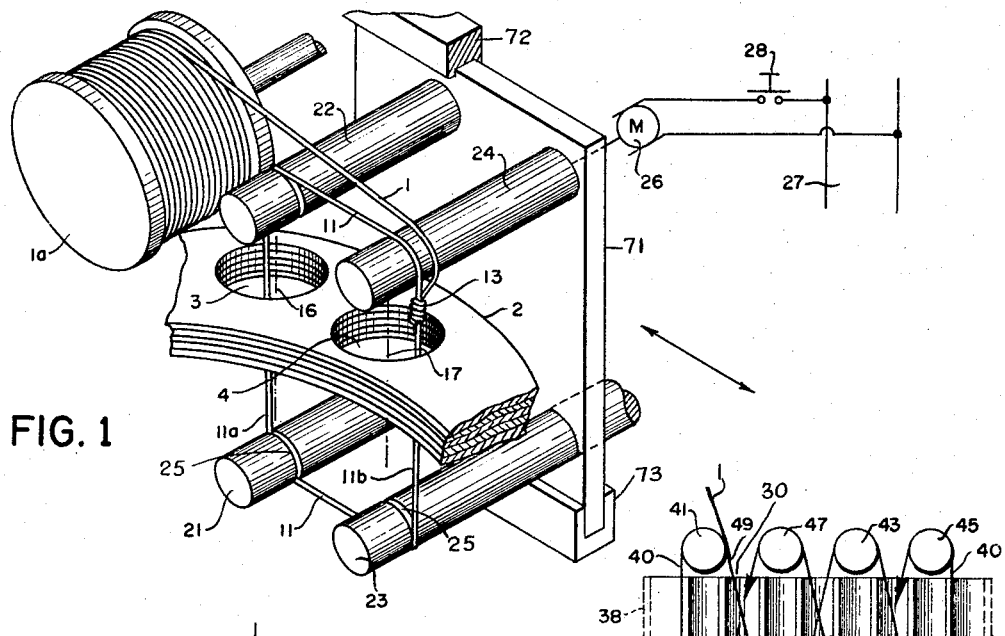
FIG. 1
FIG. 3
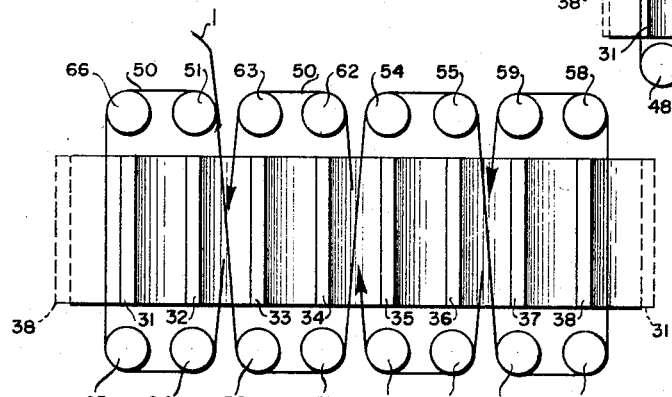
FIG. 4
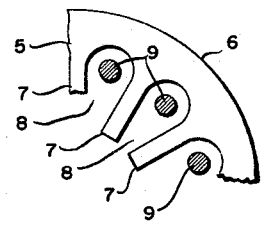
FIG. 2
INVENTOR.
Henry T. Machlanski
BY
ATTORNEY

2,896,868

METHOD OF AND APPARATUS FOR WINDING COILS IN PLACE

Henry T. Machlanski, Westwood, N.J., assignor to Kearfott Company, Inc., Little Falls, N.J., a corporation of New York Application May 7, 1952, Serial No. 286,474

10 Claims. (Cl. 242—1.1)

This invention relates to a method of and apparatus for winding coils and windings in place in an electromagnetic structure, such as a magnetizable core having tunnels or slots for accommodating windings and coils.

The primary object of this invention is to provide a simple and fast method of winding coils in position in the slots of a rotor or stator of a dynamo-electric machine.

Another object of the invention is to provide a simple winding apparatus that shall be capable of automatic or semi-automatic operation.

Another object of the invention is to provide a simple method of and apparatus for winding a coil directly in position in the slots of the machine where the coil is ultimately to be disposed, and to accomplish such winding operation with a minimum of frictional surface rubbing that might weaken or damage or remove the insulation from the wire that is being wound into the coil.

In present conventional procedure of winding small dynamo-electric machines, present conventional practice follows one of two procedures.

In one procedure, the coil is formed as a unit on a form outside of the rotor or stator on which the coil is to be ultimately disposed, and then the coil is fitted or pressed into the slots in which the coil is to be located for its functional operation. When a coil is thus formed, the wire convolutions or turns may be taped together, or they may be left loose. Where the coil wires and turns are taped together, each operating side of the taped coil is then forced as a unit into the slot which it will occupy. Where the mouth of the slot is rather narrow, the coil sides are not taped together, but the individual turns of the coil are laid into the slot by being introduced through the mouth or opening of the slot in sub groups of the total number of turns, until all of the turns of the coil have been laid into the slot.

In another procedure for forming a coil or winding in position in the slots, a long section of wire is formed directly on the stator as a form, and the wire is progressively laid in one slot after another, leaving sufficient material between the slots to serve as loops which may be anchored in suitable fashion to the structure.

My method herein involves winding and forming a coil or winding directly in position in the slots in the magnetizable core structure that the coil is to occupy in service. This method involves forming one turn of the coil or winding in a loop path through the slot passages that are to be occupied, with the one-coil circuit corresponding substantially to the average dimension of the loop of the finished coil that is to be made, and then circulating the loop thus formed through the path initially laid out for the coil, to continuously draw from a storage or supply reel until the continuous circulation of the coil draws sufficient wire from the reel to form the number of coil sides desired in the final finished coil.

During the formation of the coil in this manner, the wire moves continuously through the slots to be occupied, as a continuous and progressive reeving action. When the desired number of coil sides have been wound, the wire is cut at any desired location to separate it from the supply spool. The coil is finished and ready for any desired redisposition and packing in the slot, and for any necessary anchoring to hold the outer end turns fixed against casual or undesired displacement.

For extra convenience, especially where a multiple coil winding, or a wave winding, for example, is to be formed, a leader of suitable material, such as nylon thread, or a rubber band, is disposed in the respective slots in the progressive sequence corresponding to the path that is desired for a circuit current through the coils or wave winding. The leader is then brought back to its point of origin to form one closed band. The leader front end is then tied to the wire of the supply reel in such manner that continuous circulation of the leader through the predetermined path established by its disposition will then pull the wire from the supply reel and will reeve it through the successive slots, along the path laid out by the original disposition of the leader. The continuous circulation of the leader along that path will continuously draw the wire through the same path, to form successive turns in the multiple coils or in the wave winding, to the number desired. When the winding operation is carried out to the point desired, the number of turns or coil sides desired are formed or available in the coils or in the winding, and the wire is then cut from the supply spool. The coils or the wave winding will then be finished and in place in the slots to be occupied. The coils or the winding may then be shifted or adjusted or repositioned and packed in the slots, and the end loops tied down as may be necessary. The leader being usually of a fine strand material, may be removed or left in place in the slots.

A feature of this invention is the arrangement whereby frictional rubbing action is practically eliminated so the insulation on the wire will not be damaged or destroyed by the winding or reeving operation. This feature is of particular importance where the wire used for the coil or winding is of a very fine diameter, particularly for use in dynamo-electric devices of very small dimensions, such as synchro units which may have a stator with a diameter as small as one inch.

The manner in which the method may be practiced, and a simple type of apparatus which may be employed in connection wtih the practice of the method, are illustrated in the accompanying drawings in which Figure 1 is a schematic view of an apparatus for winding a coil on a magnetizable core structure having closed coil slots or tunnels;

Figure 2 is a plan view of an arcuate portion of a stator having slots open at their inner ends; and Figures 3 and 4 are similar diagrammatic views showing arrangements and methods for winding a multi-loop or wave winding by means of this process.

As shown in Figure 1, wire 1 from a supply reel 1–a is to be wound to form a coil directly in place in coil-holding tunnels on a magnetizable core structure 2, a portion of which is shown, by way of example, as being provided with two tunnel openings 3 and 4 through which the two sides of the finished coil are to extend for normal disposition of the coil. Usually a magnetizable core structure is provided with open slots as in the arcuate portion of a structure shown in Fig. 2. The structure 5 may be considered part of a stator, which is usually formed as a stack of flat circular stampings, individually shaped to have an outer annular ring 6 and spaced inwardly projecting teeth 7 separated by spaces or slots 8 for receiving the magnetizing coils or windings 9, shown in section. The illustration of Fig. 1 is employed in this instance to illustrate more graphically the generality of the present invention, for use with open slots, or with tunnels that are essentially closed slots.

In the process of winding and forming the desired coil with the desired number of turns therein, as in Fig. 1, the first step is to make one loop, such as the loop 11, having a length corresponding to the minimum length in one turn of the desired finished coil. This primary loop 11 serves as a leader loop, and it may be made of the wire itself, which is to be drawn from the supply reel 1–a, or the leader loop 11 may be made of some other suitable material, such as a thin thread of nylon or rubber. To the leader loop 11 is attached the front end of the wire reel 1–a, by a small knot or by tacking with cement at 13. The leader loop 11 is shown as positioned after it has been threaded or reeved through the two tunnel passages 3 and 4, ready to be circulated to form a loop. For the additional purposes and features of this invention, the leader loop 11 is supported with the two coil sides 11–a and 11–b supported in substantial parallel alignment with the axes 16 and 17 of the respective tunnel passages 3 and 4. To provide such support for the leader loop 11, and consequently for the turns of the coil that will be formed, four spindles or rollers 21, 22, 23, and 24 are provided and disposed so that the axes 16 and 17 will be substantially parallel to the tangents of each pair of rollers 21 and 22, 23 and 24. Thus, the paired rollers 21 and 22 support the coil side 11–a substantially along the axis of the tunnel passage 3, and similarly the paired rollers 23 and 24 support the coil side 11–b along the axis 17 of the passage 4. In that manner the wire that will be pulled along the path outlined by the leader loop 11 will be held away from the edges and surfaces of the metal magnetizable core 2, or of any liners or separators that might be used therewith, and thereby any frictional rubbing that would otherwise occur is obviated, with consequent prevention of any damage or destruction of the insulation that may be originally provided on the wire 1. The rollers 21 to 24, inclusive, may further be provided with shallow peripherally fluted or concave recessed portions 25 to receive and confine the leader 11, and help to retain the subsequent coiling loops of the wire 1 at a limited zone, and to prevent creeping of the coil turns along the peripheries of the rollers.

All of the rollers 21 to 24 may be arranged to be driven by applied mechanical power, or one roller may be arranged to be driven by a motor 26 that may be energized from any suitable circuit 27 through a switch that may be readily controlled by the operator of the machine. In such case, the other rollers 21, 22, and 23 may be supported merely for idler movement, in response to the circulation of the leader coil 11 and the following turns of the coil to be formed from the wire 1.

Once the leader loop 11 has been properly arranged and disposed on the four supporting rollers 21 to 24, and the front end of the wire 1 attached to the leader loop 11, as at the point 13, the winding operation may commence. Upon starting the motor 26, the drive roller 24 will impart clockwise rotation to the leader loop 11, and that loop in circulating around the path laid out for it by the manner in which it is supported on the rollers, will continuously draw the wire 1 through the same path of circulation to form a coil having the same general dimensions as the leader loop 11, with the number of turns desired, all of which may be controlled by the operator of the machine at the switch 28. Suitable control means, such as turn counters may be utilized to close with the switch and to control the opening of the switch to stop the winding operation when a desired number of turns have been wound.

When the desired number of turns have been accumulated in the coil, the wire 1 is cut at an appropriate point by the operator to provide the end terminal for the coil. The leader loop 11 is then cut and removed to provide access to the front terminal end of the coil, adjacent the spot 13, or the leader may be left in the coil after the front end is detached for use as a terminal.

By this method of operation the coil is formed directly on the magnetizable core member 2, in the slots, or in tunnel passages as in this case, where the coil is to be utilized for its magnetizing function. The end turns of the coil are then fastened down and secured in place against disturbance or displacement by subsequent manual handling during the manufacturing operation, or by centrifugal force during operation.

For the purpose of the present illustration, the lengths of the end turns of the coil, beyond the slots, have been exaggerated. One of the features of this invention is that the size of the end turns may actually be considerably diminished over the lengths required by present conventional methods, since present methods require longer loops in many cases in order to provide enough for the manual manipulation that is necessary in handling the finished coils in order to insert the coils into the slots where the coils are to be used. Of course, where closed tunnel passages are to be employed, as shown in Fig. 1, then preformed coils made by present conventional practice could not be utilized at all.

Fig. 3 shows an extension of the principle illustrated and described in Fig. 1, as applied to the formation of a wave winding 30. For illustration, the elements of the wave winding 30 are arranged in conjugate, to provide, in effect, a multi-coil winding, insofar as the magnetizing effects are concerned.

In Fig. 3 the invention is shown applied to an 8-pole 8-slot structure, which may be considered to be a stator core, shown developed. The eight teeth are numerically designated 31 to 38, the left-hand tooth 38, shown dotted, being the same tooth as number 38 at the right-hand end, and the dotted tooth number 31 at the right-hand end being the same tooth as number 31 on the left-hand side.

In this case, in the arrangement shown in Fig. 3, a leader loop 40 is disposed in the appropriate slots and around several pulleys 41 to 48, inclusive, in the proper sequence to form the several magnetizing loops necessary to magnetize the core teeth with the desired magnetic polarity. The leader loop 40 illustrated here by way of example, may be seen to progress from a point which may be taken as the knot or point of attachment 49 down through slot 32—33, which will represent the slot between tooth number 32 and tooth number 33, thence over and up through slot 34—35 over and down slot 36—37 and over and up through slot 38—31, and so on back to the point of starting at the knot or point 49. The leader loop 40 is then progressively circulated along its prescribed path or orbit, around the pulleys and through the slots. In consequence of the continuous circulating movement of the closed leader loop 40, along and around its closed path through the selected active slots, the wire 1 is correspondingly circulated along the same path with the leader loop and caused to form correspondingly shaped wire loops, until the desired number of slot turns are wound in the winding thus formed. The winding operation may then be terminated and the wire 1 severed at a suitable point or distance back of the attachment point 49, to provide one terminal for the winding thus formed. The wire at the attachment point may be then removed from the leader loop to make available the other terminal of the winding thus formed. The leader may be left in the slots.

The entire winding is thus formed in position where it is to be used, and all of the strands in any one slot that make up the coil-side for that slot may then be shifted and compressed, or otherwise selectively located in the slot, with any suitable liner or spacer if such be desired, to insulate the turns of that first winding from any subsequent winding that may also be wound into and disposed in the same active slot, where a plural phase construction may be desired.

A similar arrangement is shown in Fig. 4, to accommodate a larger stator. There a leader 50 is shown for an effective multi-coil winding. In order to support the leader loop 50, and subsequently the wire turns that will be circulated through the path laid out by the leader loop 50, two pairs of rollers are shown provided for each active slot. The course of the path of the leader loop 50 may be readily traced by following its progress along the supporting rollers which will be numbered in numerical consecutive order to indicate the progression of the leader loop 50 around its path of circulation. Thus the leader loop 50 starts at the top roller 51, over tooth 32, down through the slot 32—33, under bottom rollers 52 and 53, up through slot 34—35 and over top rollers 54 and 55, down and around bottom rollers 56 and 57, up and back over top rollers 58 and 59, down and around bottom rollers 60 and 61, up and over top rollers 62 and 63, thence down and around bottom rollers 64 and 65, and up around and over rollers 66 and 51, back to the point of origin, at which the wire from the supply reel is attached to the leader. It will be observed that the adjacent rollers at the same end of any active slot, in which the coil turns are to be formed and disposed, rotate in reverse directions. The forward moving strand and the returning strand both move through the slot in the same direction. Moreover, the two strands are moving at the same velocity. There is, therefore, no relative movement between them to establish a frictional or rubbing action that would tend to damage or destroy any of the insulation on those wire strands as they circulate along and through the path laid out to form the winding or coil sections. By reason of this feature of synchronized movement of different strands or sections of a progressively circulating loop or coil of wires, frictional rubbing action is entirely obviated and makes this method of coil winding feasible and practical.

As was mentioned in connection with the illustration in Fig. 1, the arrangement may be provided with driving power on all of the rollers, or on less than all of the rollers, or on merely one of the rollers, in which case the remaining unpowered rollers may be mounted for free idler rotation.

Once the winding is formed, the rollers may then be slipped out from underneath the end loops, and the end loops may then be anchored and fastened in any suitable approved manner. As was explained in connection with the illustrative showing of Fig. 1, this method of winding the coil sides of a complete winding directly in place in the slots where the winding is to be used, permits the use of shorter coil end-loops with consequent saving of copper wire, decrease in weight of the finished product, and saving of space in the finished structure.

The rollers may be mechanically supported in any suitable manner that will permit the rollers to be positioned to guide the leader loop and the wire in the manner described. Such supporting arrangement for the rollers may take various forms to achieve the desired result. For the purpose of the present description, it is sufficient to indicate one simple arrangement for supporting the rollers and for positioning them to guide the wire and the accumulating coil loop away from the sharp corners or edges of the slots or tunnels.

One set of rollers, 21 to 24, inclusive, may be mechanically supported for individual rotation on a vertical support, shown for simplicity as a plate 71. The plate 71 may be double, to provide two-bearing support for each roller, obviously.

Suitable means, shown simply as guide rails 72 and 73 support and guide the plate 71 to permit manual placement of the plate as may be appropriate to correspond to the winding diagram, as, for example, in Figure 4.

Additional plates and rollers may be added as necessary. Obviously, to accommodate the curvature of the magnetic structure 2 being wound, the plate 71 and the guiderails 72 and 73 should be appropriately curved. The number of plates and rollers will be determined by the winding diagram. Similarly the spacing of the rollers on the plates, and of the plates themselves will be determined by the winding diagram, such as shown in Figure 3 or 4.

By means of the method and apparatus herein illustrated, a high speed operating technique is possible, by the provision of pre-formed leader loops which may be readily threaded through or disposed in passages or slots in which the coil sides are to be disposed to establish the magnetizing action that is desired. By suitable modification, the operation may be made automatic after the leader is inserted.

What is claimed is:

1. The method of winding wire from a supply spool or reel into a coil directly in position in a pair of spaced slots in a toothed magnetizable core structure, which consists in disposing a leader in the first slot and in the second slot in which the coil is intended to be finally disposed, joining the ends of the leader to form a closed loop, joining the wire from the supply reel to the wire body entering the first slot, and then continuing to circulate the coil thus formed through the two slots until the coil contains the desired number of turns, including the operation of supporting the wire elements of the coil in a predetermined orbit substantially defining the ultimate boundary dimension of the final desired coil.

2. The method of forming a wire coil in position in a pair of spaced slots of a toothed magnetizable core structure, from the wire to be drawn from a supply spool or reel, which consists in forming a wire leader into one complete loop, in position in the two slots and disposed to trace an orbit defining substantially the minimum dimensional outline of the final desired coil, and then circulating the leader loop to add additional turns to the coil, to the desired number.

3. The method of forming a wire coil in position in a pair of spaced slots of a toothed magnetizable core structure, from the wire to be drawn from a supply spool or reel, which consists in forming a wire leader from the spool of wire into a first loop of substantially the loop dimension of the desired coil, supporting such first loop in an orbit including the paths lengthwise through the two slots, and then circulating the first loop in the orbit to add additional turns to the coil, as desired.

4. The method of forming a wire coil in position in a pair of spaced slots of a toothed magnetizable core structure, from the wire to be drawn from a supply spool or reel, which consists in forming a leader into a first loop of substantially the loop dimension of the desired coil, supporting such first loop in an endless path including the two slots, and then circulating the loop and the wire from the reel in such path to form the coil with the desired number of turns.

5. The method of winding a coil in place in a pair of spaced slots of a toothed magnetizable core member, from the wire to be drawn from a supply spool or reel, which consists in forming a leader loop along an orbit passing through the slots that are to receive the finished coil, supporting the loop for free circulating movement in such orbit and free of frictional engagement with any surface of the core member, and circulating the loop and the wire from the reel to form additional loops of wire of corresponding dimension until the coil is formed with the desired number of turns.

6. The method of winding a coil in place on a cylindrical magnetizable structure having peripherally spaced radial teeth separated by slots for accommodating the coil, which consists in reeving a wire leader in a forward direction through a first slot that is to be occupied by one side of the coil to be formed, looping the wire leader and reeving it back in the reverse direction through a second slot that is to be occupied by the other side of the coil to be formed, relooping the leader from the exit of the second slot to the entrance of the first slot, and re-reeving the wire leader through the first slot together with a continuing portion of the wire body and thence similarly through the second slot, and so continuing until a coil is wound directly in place in the two slots, in final desired position, with the desired number of turns.

7. The method of winding a multi-coil winding directly in place in final desired position in spaced slots in a magnetizable core structure, from a supply spool of wire, which consists in disposing a leader along a path defining such final desired position and disposed in passages within slots to be occupied by coil sides and disposed in the direction to be traversed by a current through the winding and defining substantially the coil dimension, returning the leader to a point of origin to form a temporary tie as a closed winding loop, and then continuing to circulate and reel such winding loop leader along and through said path to draw additional wire loops from the supply spool to conform to the figure of said path, until the desired number of turns is accumulated in the winding.

8. Mechanism for winding a coil in place in a slotted magnetizable core structure, from a supply spool or wire, comprising a pair of rollers for each end of each slot in which a coil side is to be positioned, means for positioning the rollers at the ends of each slot to define and maintain a tangential winding path between the rollers at the respective ends of said slots and within a middle zone in the slot in order to avoid frictional rubbing contact of the wire against the core structure, and means for driving the rollers in predetermined directions at each end of said slots to circulate and reel the wire within the confines of the slots, and directly in place, to accumulate the number of turns desired in the final winding in position in each slot.

9. Winding mechanism for forming a coil or winding directly in place in the slots of a slotted magnetizable core structure, comprising a pair of rollers to be disposed adjacent the feed end of a live slot that is to receive a winding or coil side, the rollers serving to carry and feed wire strands or turns continuously and convergingly into such slot; and means for oppositely rotating the rollers of each pair at each end of such slot but at the same angular velocity to converge the strands or turns into the slot and move them at the same constant linear velocity, to prevent relative linear movement between the several strands.

10. Winding mechanism as in claim 9, including, similarly, a pair of rollers to be positioned at the exit end of such slot and serving to divert the strands or turns from the slot into two separate paths, said roller-rotating means serving also to rotate the exit rollers in opposite directions at the same angular velocity.

References Cited in the file of this patent

UNITED STATES PATENTS

| | | |
|---|---|---|
| 302,417 | Mather | July 22, 1884 |
| 751,816 | Strong | Feb. 9, 1904 |
| 1,431,947 | Gysel | Oct. 17, 1922 |
| 2,640,652 | Harvey | June 2, 1953 |

FOREIGN PATENTS

| | | |
|---|---|---|
| 503,525 | Germany | July 24, 1930 |